UNITED STATES PATENT OFFICE.

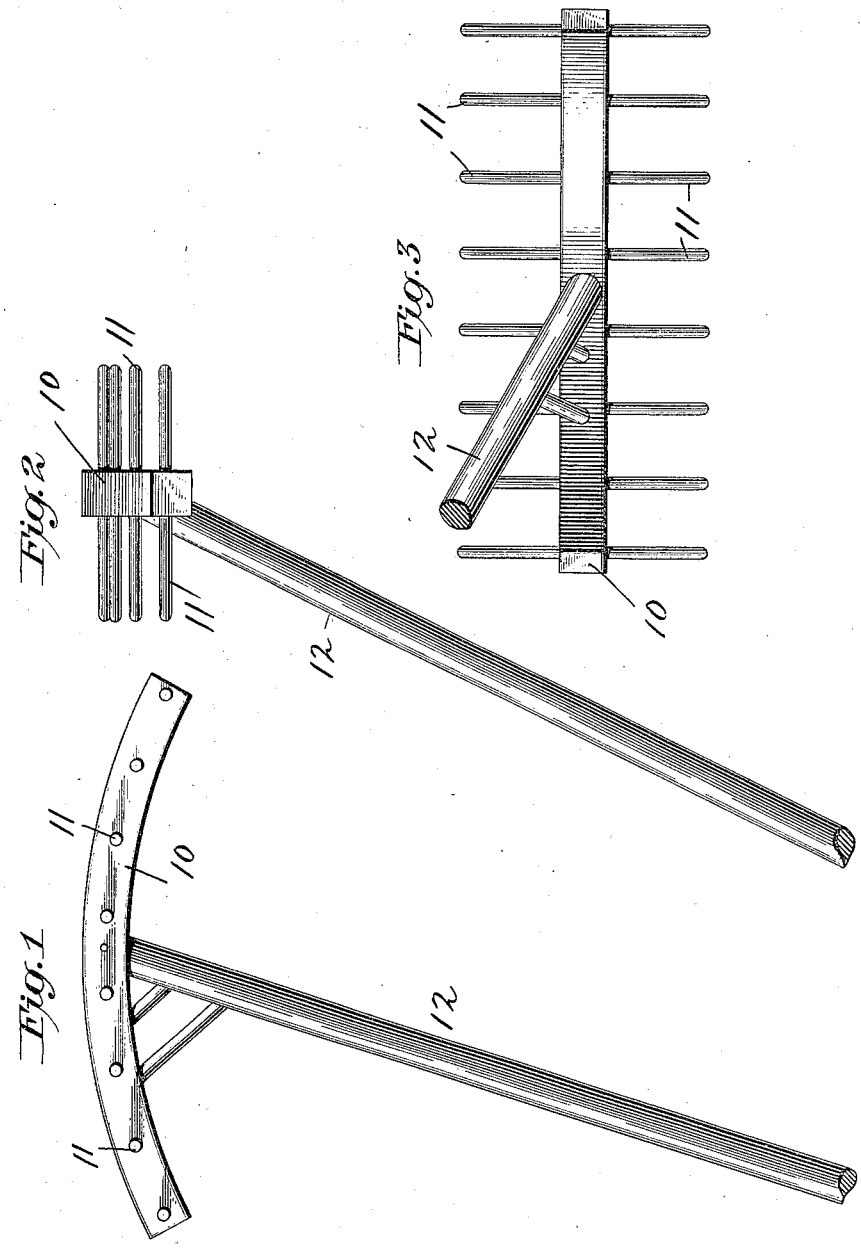

ANNA K. GILSON, OF QUECHEE, VERMONT.

RAKE.

1,029,988.  Specification of Letters Patent.  Patented June 18, 1912.

Application filed August 7, 1911. Serial No. 642,683.

*To all whom it may concern:*

Be it known that I, ANNA K. GILSON, a citizen of the United States, residing at Quechee, in the town of Hartford, county of Windsor, and State of Vermont, have invented an Improved Rake for Use in the Field or on Lawns, of which the following is a specification.

My invention relates to an improved field and lawn rake in which the teeth protrude through each side of a curved head into which they are inserted so that there is no plane surface to the head of the rake but either side may be used. The head holding the teeth is in the form of a bow and not straight as in most rakes, the curve of the bow or arc is of such an angle that the rake may be applied to the surface of the ground with a side stroke like sweeping or mowing instead of dragging it from behind or pulling it directly toward you. With the teeth extending through the curved head one may rake either on the left or right side by merely turning the rake over when it will be applied with equal effectiveness on the opposite side thereby enabling the one using it to rake from either side in a swinging movement.

The accompanying plan shows three positions of the rake.

Figure "1" shows the rake resting on ground in front of the person using it and gives a clear cut of the braces extending from handle to head. Fig. "2" shows rake resting on ground with handle up and shows the curved head with teeth protruding. Fig. "3" shows the rake being swung from the right side as it appears when in use.

The rake may be constructed of iron or wood and may be large or small but the angle of the curved head must be maintained proportionate to its length and the arc formed by the curved head must be regular and perfect and be increased as the length of the rake head increases in order to have it hang naturally and come into even contact with the ground when used.

The handle may be of wood or some metal and fastened to the center of the head by welding or being mortised into the same and may be long or short as convenience and size of rake require. Two braces must extend from the handle on one side only to the curved head at the point where the greatest strain would come when in use; these braces may also be of iron or wood and fastened by screws or mortised into the handle and head, more than two may be necessary if the rake is a large one.

When using the rake on right side the right hand should grasp the handle above the middle and the left hand near the end and the braces should always indicate the back side of the rake when in use. Above position would be reversed when using rake on left side.

In the drawings the rake head is designated 10, the teeth 11 and the handle 12.

Having thus fully described the nature and object of my invention, what I claim as new and desire to secure by Letters Patent, is—

1. The combination of a rake head having oppositely projecting series of teeth that extend in a curved or arc shaped line, and a handle attached to the rake head at the inner side of the arc at mid length thereof and extending therefrom at an angle to the chord of the arc so that the angle formed by the handle with the head is acute on one side and obtuse on the other.

2. The combination with a curved or arc shaped rake head having teeth on both sides thereof, of a handle attached on the inner side of the arc at its center and extending therefrom at an angle of approximately seventy-five degrees to the chord of the arc so that the angle formed by the handle with the head is acute on one side and obtuse on the other.

ANNA K. GILSON.

Witnesses:
ANNA L. RAYMOND,
WM. E. MCCREEDY.

---

Copies of this patent may be obtained for five cents each, by addressing the "Commissioner of Patents, Washington, D. C."